US008483182B1

(12) United States Patent
Keller et al.

(10) Patent No.: US 8,483,182 B1
(45) Date of Patent: Jul. 9, 2013

(54) SINGLE RADIO VOICE CALL CONTINUITY HANDOVER OF CALLS WITH VIDEO MEDIA FROM A CIRCUIT SWITCHED ACCESS NETWORK

(75) Inventors: Ralf Keller, Wurselen (DE); Fredrik Lindholm, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/392,343

(22) PCT Filed: Jan. 27, 2012

(86) PCT No.: PCT/EP2012/051341
§ 371 (c)(1),
(2), (4) Date: Feb. 24, 2012

(51) Int. Cl.
*H04W 4/00* (2009.01)

(52) U.S. Cl.
USPC ........... 370/331; 370/332; 370/333; 370/334; 455/436

(58) Field of Classification Search
USPC .......................... 370/331–334; 455/436–444
See application file for complete search history.

(56) References Cited

U.S. PATENT DOCUMENTS

2011/0249652 A1* 10/2011 Keller et al. ................. 370/331

OTHER PUBLICATIONS

International Search Report and Written Opinion of International Searching Authority, PCT Application No. PCT/EP2012/051341, Oct. 12, 2012.
3GPP, "3rd Generation Partnership Project; Technical Specification Group Services and System Aspects; Feasibility Study of Single Radio Video Call Continuity (vSRVCC); Stage 2 (Release 10)", 3GPP Standard; 3GPP TR 23.886, 3rd Generation Partnership Project (3GPP), Mobile Competence Centre; 650, Route des Lucioles; F-06921 Sophia-Antipolis Cedex; France, vol. V10.0.0, Sep. 29, 2010, pp. 1-33, XP050442337.
3GPP, "3rd Generation Partnership Project; Technical Specification Group Services and System Aspects; Feasibility Study of Single Radio Voice Call Continuity (SRVCC); from UTRAN/GERAN to E-UTRAN/HSPA; Stage 2 (Release 11)", 3GPP Standard; 3GPP TR 23.885, 3rd Generation Partnership Project (3GPP), Mobile Competence Centre; 650, Route des Lucioles; F-06921 Sophia-Antipolis Cedex; France, vol. SA WG2, No. V11.0.0, Sep. 23, 2011, pp. 1-83, XP050553882.
3GPP TS 23.237 v11.2.0; "3rd Generation Partnership Project; Technical Specification Group Services and System Aspects; IP Multimedia Subsystem (IMS) Service Continuity"; Stage 2 (Release 11); Sep. 2011; 154 pages.

(Continued)

*Primary Examiner* — Mark Rinehart
*Assistant Examiner* — Mang Yeung
(74) *Attorney, Agent, or Firm* — Myers Bigel Sibley & Sajovec, P.A.

(57) ABSTRACT

A method is provided of performing a handover with Single Radio Voice Call Continuity, SRVCC, of a telecommunications session from a User Equipment, UE accessing an IP Multimedia Subsystem, IMS, network via a Circuit Switched, CS, access network to a target Packet Switched, PS, access network. The method includes receiving a handover request from the CS access network to transfer the session and determining that the telecommunications session comprises data media in addition to, or without, any audio media. The ability to perform the handover with SRVCC for the data media is determined. Bearer resources for the session when handed over to the PS access network are allocated, including a data media bearer and, if there is any audio media in the session an audio media bearer. The session is transferred from the CS to the target PS access network.

22 Claims, 6 Drawing Sheets

OTHER PUBLICATIONS

3GPP TS 23.228 v11.2.0; "3$^{rd}$ Generation Partnership Project; Technical Specification Group Services and System Aspects; IP Multimedia Subsystem (IMS)"; Stage 2 (Release 11); Sep. 2011; 274 pages.

Change Request: 3GPP TSG-SA WG2 Meeting #88; S2-115354 TS 23.216 CR 0235 v11.2.0; "Introduction of SRVCC from CS to PS"; (Release 11); Nov. 14-18, 2011; 27 pages.

* cited by examiner

SINGLE RADIO VOICE CALL CONTINUITY HANDOVER OF CALLS WITH VIDEO MEDIA FROM A CIRCUIT SWITCHED ACCESS NETWORK

CROSS REFERENCE TO RELATED APPLICATION

This application is a 35 U.S.C. §371 national stage application of PCT International Application No. PCT/EP2012/051341, filed on 27 Jan. 2012, the disclosure and content of which is incorporated by reference herein in its entirety.

TECHNICAL FIELD

The present invention relates to methods and apparatus in a telecommunications network for enabling handover of a call from a Circuit Switched (CS) to a Packet Switched (PS) access network. More particularly, the invention relates to methods and apparatus for enabling handover of a call that includes video or other data media with Single Radio Voice Call Continuity.

BACKGROUND

IP Multimedia services provide a dynamic combination of voice, video, messaging, data, etc, within the same session. This has lead to a growth in the numbers of basic applications and the media which it is possible to combine, leading to a growth in the number and variety of services offered to the end users—so-called "combinational IP Multimedia" services.

IP Multimedia Subsystem (IMS) is the technology defined by the Third Generation Partnership Project (3GPP) to provide IP Multimedia services over mobile communication networks. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and application servers). Whilst SIP was created as a user-to-user protocol, IMS allows operators and service providers to control user access to services and to charge users accordingly. Other protocols are used for media transmission and control, such as Real-time Transport Protocol and Real-time Transport Control Protocol (RTP/RTCP).

FIG. 1 illustrates schematically how the IMS fits into the mobile network architecture in the case of a General Packet Radio Service (GPRS) access network. As shown in FIG. 1 control of communications occurs at three layers (or planes). The lowest layer is the Connectivity Layer 1, also referred to as the bearer plane and through which signals are directed to/from user equipment (UE) accessing the network. The entities within the connectivity layer 1 that connect an IMS subscriber to IMS services form a network that is referred to as the IP-Connectivity Access Network, IP-CAN. The GPRS network includes various GPRS Support Nodes (GSNs). A gateway GPRS support node (GGSN) 2 acts as an interface between the GPRS backbone network and other networks (radio network and the IMS network). The middle layer is the Control Layer 4, and at the top is the Application Layer 6.

The IMS 3 includes a core network 3a, which operates over the middle, Control Layer 4 and the Connectivity Layer 1, and a Service Network 3b. The IMS core network 3a includes nodes that send/receive signals to/from the GPRS network via the GGSN 2 at the Connectivity Layer 1 and network nodes that include Call/Session Control Functions (CSCFs) 5, which operate as SIP proxies within the IMS in the middle, Control Layer 4. The top, Application Layer 6 includes the IMS service network 3b. Application Servers (ASs) 7 are provided for implementing IMS service functionality.

As shown in FIG. 1, User Equipment (UE) can access the IMS by attaching to an access network and then over the Connectivity Layer 1, which is part of a PS domain. In that case an IMS session can be set up by the UE using SIP signalling. FIG. 2 illustrates schematically the main components that are relevant to the present disclosure of a PS Evolved Packet Core (EPC) network in accordance with the 3GPP defined Systems Architecture Evolution (SAE), and shows a UE 20 accessing an IP network shown as the Internet 21. The principal network entities shown include a Serving Gateway (SGW) 23, a Public Data Network (PDN) Gateway (PGW) 24, an evolved NodeB (eNodeB) 25, a Mobility Management Entity (MME) 26 and the user's Home Subscriber Server (HSS) 27. For the purposes of the following discussion the SGW 23 and PGW 24 will be grouped together as one entity SGW/PGW.

Many existing access networks operate only using CS technology, but a UE may also access IMS services via a CS domain. Although the CS domain will not handle SIP, procedures are well established for dealing with the provision of media and services between the IMS and a UE using a CS access. There are many occasions when during a call/session it is required to transfer or hand over the call/session from one access network to another. There are a variety of factors that are used to determine when a call needs to be handed over to another access network, but these are not particularly relevant to the present discussion. All we need to know is that the CS access network determines, based on the cells for which the UE reports measurements, when the conditions arise that require a request to be made to the core network for the call to be handed over. Single Radio Voice Call Continuity (SRVCC) is described in 3GPP TS 23.237 and 3GPP TS 23.216, specifying procedures for handover of a voice call from a PS access to a CS access (e.g. transfer of a Voice-over-IP, VoIP, IMS session from an evolved Universal Terrestrial Radio Access Network, E-UTRAN, to a Universal Terrestrial Radio Access Network/GSM Edge Radio Access Network, UTRAN/GERAN). These technical specifications have also been extended to allow handover of a voice call from a CS access to a PS access.

However, the procedures specified for CS to PS handover with SRVCC include only the handover of voice/audio media, and do not specify how to handle the handover procedure for other media—i.e. media data carried by a different bearer than the audio media bearer. This problem is addressed by the following discussion.

SUMMARY

A first aspect provides a method of performing a handover with Single Radio Voice Call Continuity, SRVCC, of a telecommunications session from a User Equipment, UE accessing an IP Multimedia Subsystem, IMS, network via a Circuit Switched, CS, access network to a target Packet Switched, PS, access network. The method includes receiving a handover request from the CS access network to transfer the session and determining that the telecommunications session comprises data media in addition to, or without, any audio media. The ability to perform the handover with SRVCC for the data media is determined. Bearer resources for the session when handed over to the PS access network are allocated, including a data media bearer and, if there is any audio media in the session an audio media bearer. The session is transferred from the CS to the target PS access network.

A second aspect provides a network server configured for use in a telecommunications network in which a call session from a User Equipment, UE, accessing an IP Multimedia Subsystem, IMS, network via a Circuit Switched, CS, access network is to be handed over with Single Radio Voice Call Continuity, SRVCC, to a target Packet Switched, PS, access network. The call session comprises data media in addition to, or without, any audio media. The network server includes a processor configured to determine the possibility of performing CS to PS handover with SRVCC based on the capability of the UE to perform a CS to PS handover with SRVCC, and the media in the session. The server also includes an input/output for sending a signal to the UE that includes a handover command with information to enable the UE to transfer the data media and any audio media in the session to the PS access network.

A third aspect provides User Equipment, UE, configured to access an IP Multimedia Subsystem, IMS, network via a Circuit Switched, CS, access network to establish a call session that includes data media in addition to, or without, any audio media, and for the call to be handed over with Single Radio Voice Call Continuity, SRVCC, to a target Packet Switched, PS, access network. The UE includes an input/output for receiving and transmitting signals via the CS access network and via the PS access network. A memory stores data and program instructions. A processor is configured to process the program instructions, on receiving a CS to PS handover command from the CS access network, to transfer the data media and any audio media in the call session to the PS access network using information provided in the handover command.

DETAILED DESCRIPTION

Figure 1:
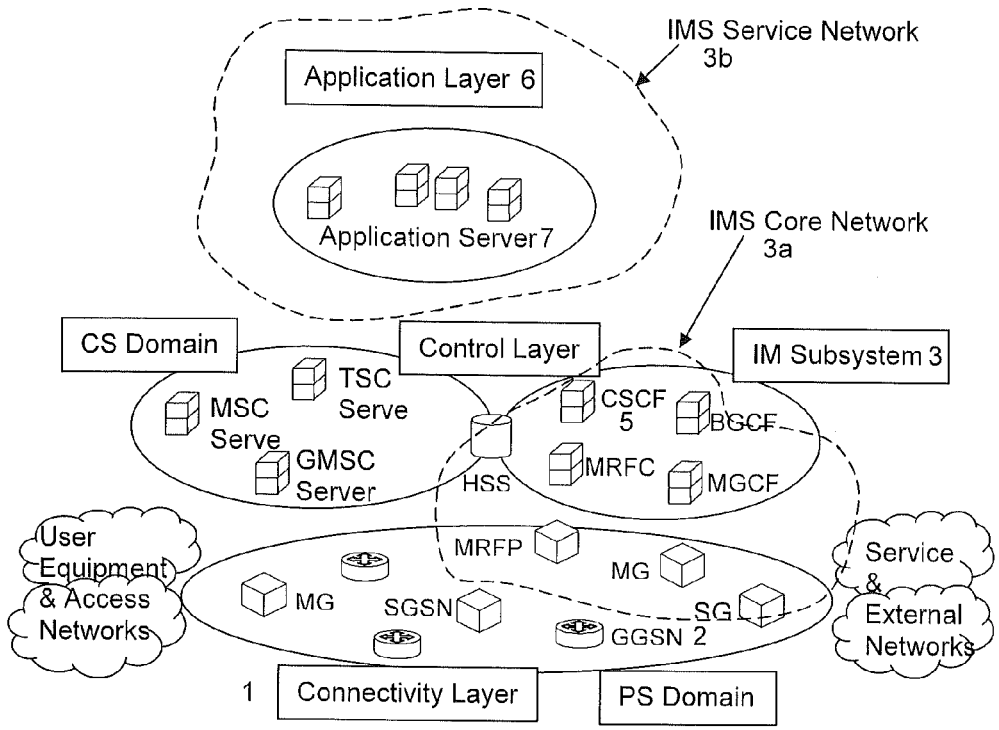
FIG. 1 illustrates schematically an IMS network in association with a mobile network architecture of a General Packet Radio Service (GPRS) access network.
Figure 2:
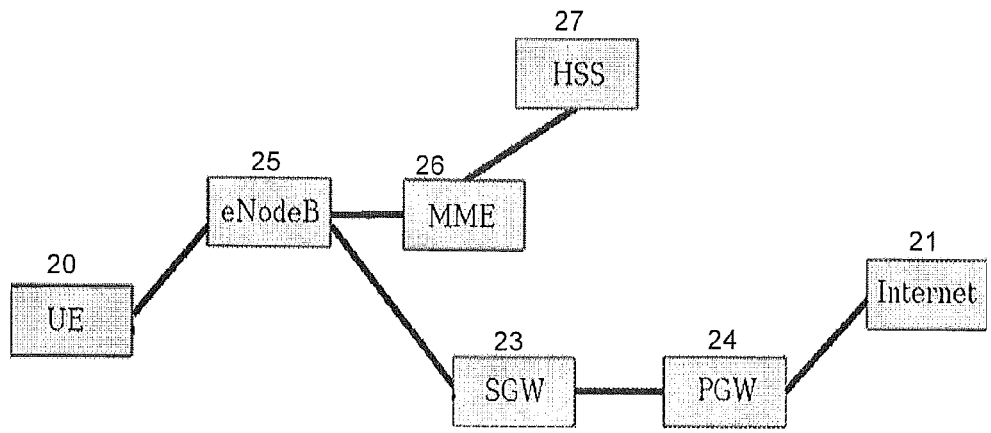
FIG. 2 illustrates schematically the components of a PS access network in accordance with the 3GPP defined Systems Architecture Evolution (SAE)
Figure 3:
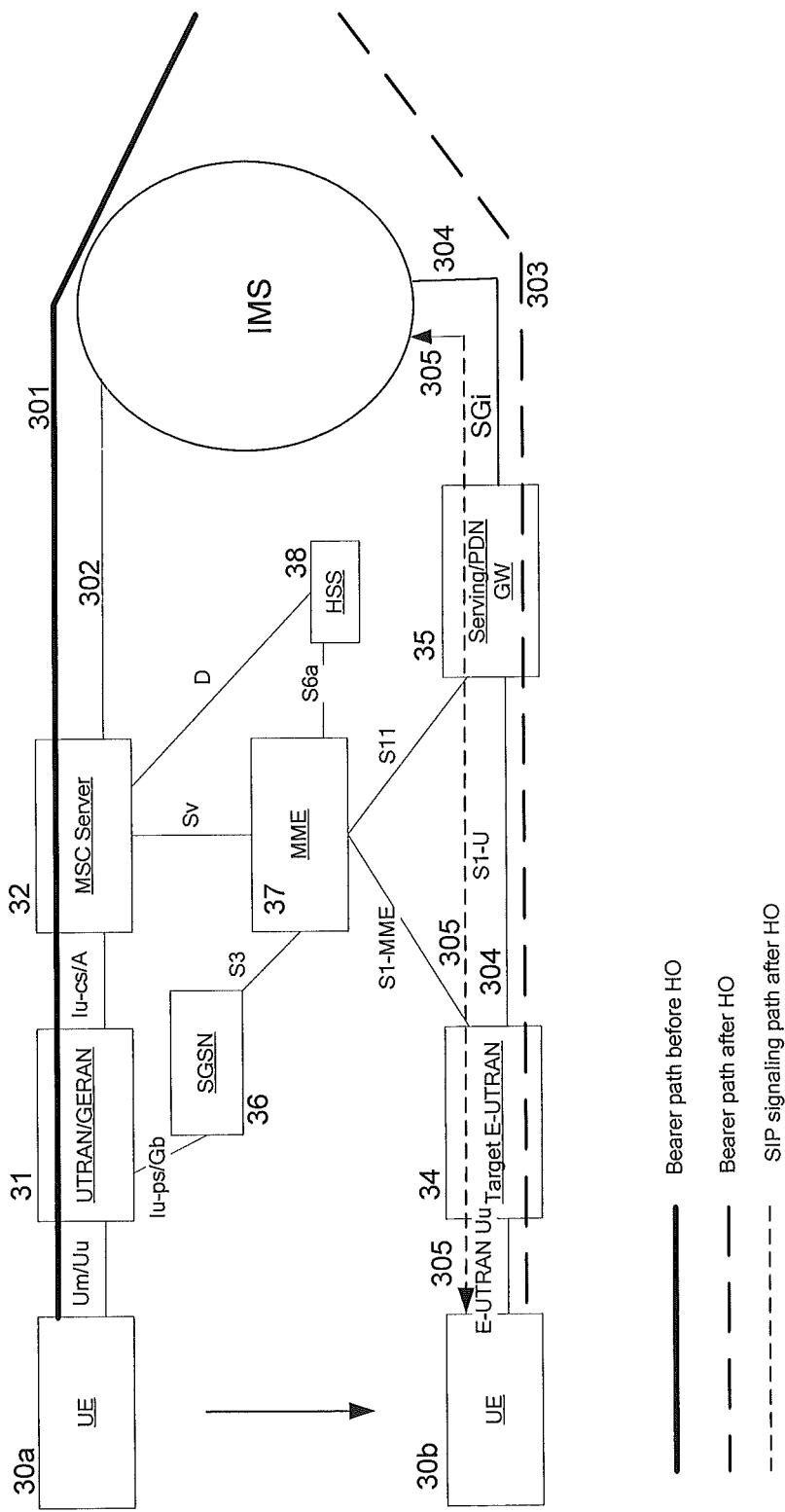
FIG. 3 illustrates schematically the interactions between network components involved in a handover from a CS access to a PS access with SRVCC.

FIG. 3 illustrates conceptually a handover of a UE 30, which is shown in a first situation 30a, prior to the handover, having established a call. The call is carried by bearers represented by solid line 301 to a terminating entity (which is not shown) over a CS, UTRAN/GERAN access network 31 and a Mobile Switching Centre (MSC) Server 32 in the CS domain. The UE 30a is also attached to the IMS 33 as represented by line 302. After the handover, the UE 30 is shown in a second situation 30b, in which the call is carried by bearers represented by the dashed line 303 over a PS, E-UTRAN, access network 34 and Serving/PDN gateways 35. The UE 30b remains attached to the IMS, as shown by solid line 304 and uses SIP signalling to communicate with the IMS, as represented by the dashed arrow-headed line 305. Also shown between the CS and PS access networks are a SGSN 36 a MME 37 and the user's HSS 38. These entities communicate with other entities over the referenced network interfaces. Note that although both the CS and PS access networks are shown in FIG. 3 communicating directly with the same SGSN 36 and MME 37, this is a simplification and in general each access network will communicate with a separate SGSN and MME associated with that access network. Thus, in a real practical deployment there would be either a source SGSN or a source MME associated with the source (in this case the CS) access network, and the same for the target (PS) network. The SGSN and MME can be separate nodes or co-located.

Figure 4:
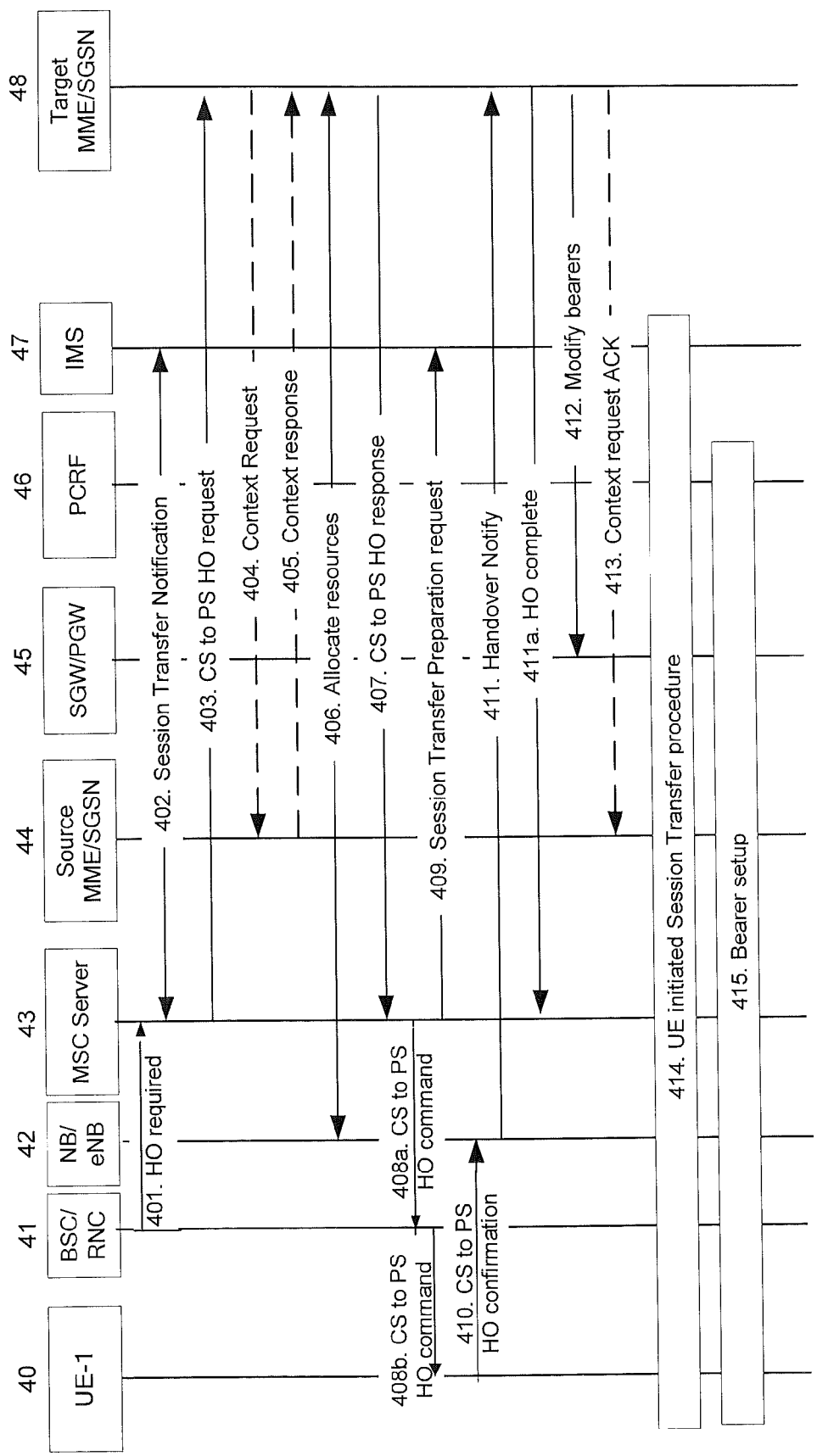
FIG. 4 is a signal diagram illustrating the procedure, as currently set out in 3GPP TS 23.216, for a CS to PS handover with SRVCC.

FIG. 4 shows the signalling involved in the handover process in accordance with TS 23.216 (version 11.2.0). The entities shown include a UE 40, which initially has a priority call set up over a CS access network represented here by a Radio Network Controller/Base Station Controller, RNC/BSC 41, that communicates with a MSC Server 43. The UE 40 is also anchored in an IMS network 47, which means that IMS sessions from and to the UE 40 are anchored at the Switching Control Centre (SCC) AS (not shown) in the UE subscriber's home IMS network so that the SCC AS sees all sessions and keeps track of them. Sessions are anchored at the SCC AS in the home IMS based on the subscriber's Initial Filter Criteria (iFC) provided by the HSS at registration. The handover procedure will require transferring the call to a PS access network, the entities of which include a NodeB (for Universal Mobile Telecommunications System, UMTS, network) or eNode B (for LTE/EPC network) 42 and a SGW/PGW 45. Also shown are a Source MME/SGSN 44 (see FIG. 3) with which the CS access network communicate, a Policy and Charging Rules Function (PCRF) 46, which triggers modification of the filters for the IMS signalling bearer when this is changed caused by a change in priority level, and a Target MME/SGSN 46 that communicates with the PS access network to which the call will be transferred.

Briefly, the procedure is as follows:

The CS access network, represented here by the RNC/BSC 41, sends a HO required signal 401 to the MSC Server 43 indicating that the call needs to be transferred to another access network. Signals 402 show the MSC Server 43 interacting with the IMS 47 according to standard procedures of TS 23.216. The MSC Server sends a SRVCC CS to PS HO request 403 to the Target MME according to standard procedures of TS 23.216. In signals 404 and 405 the target MME/SGSN 48 performs a context request if this is required according to standard procedures of TS 23.216. In signals 406, the target MME/SGSN 48 allocates resources for all PS bearers in the PS access network (e.g. E-UTRAN or UTRAN (High Speed Packet Access—HSPA)). Signals 407-411a are the standard procedure of TS 23.216, in which the handover instruction (CS to PS HO command 408a, 408b) is sent back to the UE 40, which then completes its attachment to the PS access network by sending a Session Transfer Preparation Request 409 to the IMS 47 to trigger switching of the media path to the IP address/port of the UE on the target access. The UE sends a Handover confirmation 410 to the eNodeB/NodeB 42, which sends a Handover Notify 411 to the Target MME/SGSN 48. The target MME/SGSN 48 sends a HO complete message 411a to the MSC Server 43 to confirm the completion of the handover. When receiving the HO Complete message 411a, the MSC Server 43 may release the local resources used by the CS access network, but will not send any session release towards IMS.

The Target MME/SGSN 48 sends Modify Bearer Request 412 to the SGW/PGW 45, to update PS bearer contexts according to Inter Radio Access Technology handover (IRAT HO) procedure as specified in 3GPP TS 23.401. The target MME/SGSN 48 includes a CS to PS SRVCC indication, which is also provided to the PCRF 46 to trigger modification of the filters for the IMS signalling bearer. If the target MME/SGSN 48 has received a Context Request from the Source SGSN/MME 44 (signal 404), the target MME/SGSN 48 sends an Acknowledgment to the Context Response 413 to the Source SGSN/MME 44. At step 414, the UE 40 initiates the Session transfer procedures according to 3GPP TS 23.237. At step 415, as a result of the Session transfer procedures, the setup of a dedicated bearer for the call is performed according to the dedicated bearer activation procedure as specified in TS 23.401.

As previously explained, the procedures specified and set out above do not consider the situation where the original call from the UE 40 in the CS network contained anything other than voice (audio) media, for example if the call involved data media, such as video, fax or other CS data. To overcome this, described below are some new procedures and functionalities of certain entities. These are described in terms of calls that involve "voice and video" media in addition to "voice only". However, it should be understood that the principles apply to any call with data media, with or without the voice media.

In addition to the standard MSC Server behaviour defined in TS 23.237 the following functions as needed.

The MSC Server 43 is configured to inform the access network of the possibility to perform CS to PS SRVCC for voice and for voice and video by sending an "CS to PS SRVCC operation possible" to the RNC/BSC 41. The access network uses that information for deciding when to send a handover request to the core network.

The MSC Server determines the possibility of performing a handover with CS to PS SRVCC based on:
1. The CS to PS SRVCC capability of the UE 40.
2. The presence of a "CS to PS SRVCC allowed" indication in the subscription data of the user.
3. The IMS registration status of the UE 40.
4. The media in the ongoing session; the MSC Server 43 needs to identify sessions with voice only and voice and video media. The MSC Server 43 will only initiate SRVCC for supported media types. Note that Fax, CS data and CS Video media may use the same BS30 bearer over CS access, and can be transferred in the same way as for video.

The "CS to PS SRVCC allowed" indication is downloaded to the MSC Server 43 from the user's HSS during the attach procedure. The "CS to PS SRVCC allowed" indication may be further qualified by "voice only" or "voice and video".

The UE 40 provides an indication to the MSC Server 43 of its capability of performing CS to PS SRVCC by providing a "CS to PS SRVCC capability indication", and, optionally, if it supports CS to PS SRVCC for additional media than voice, such as video, CS data or fax. If the UE 40 does not provide this explicit indication to the MSC Server 43, the MSC Server may use other means to decided whether CS to PS SRVCC for the particular media could be performed, such as from subscription information, or from UE supported media registered in IMS.

Figure 5:
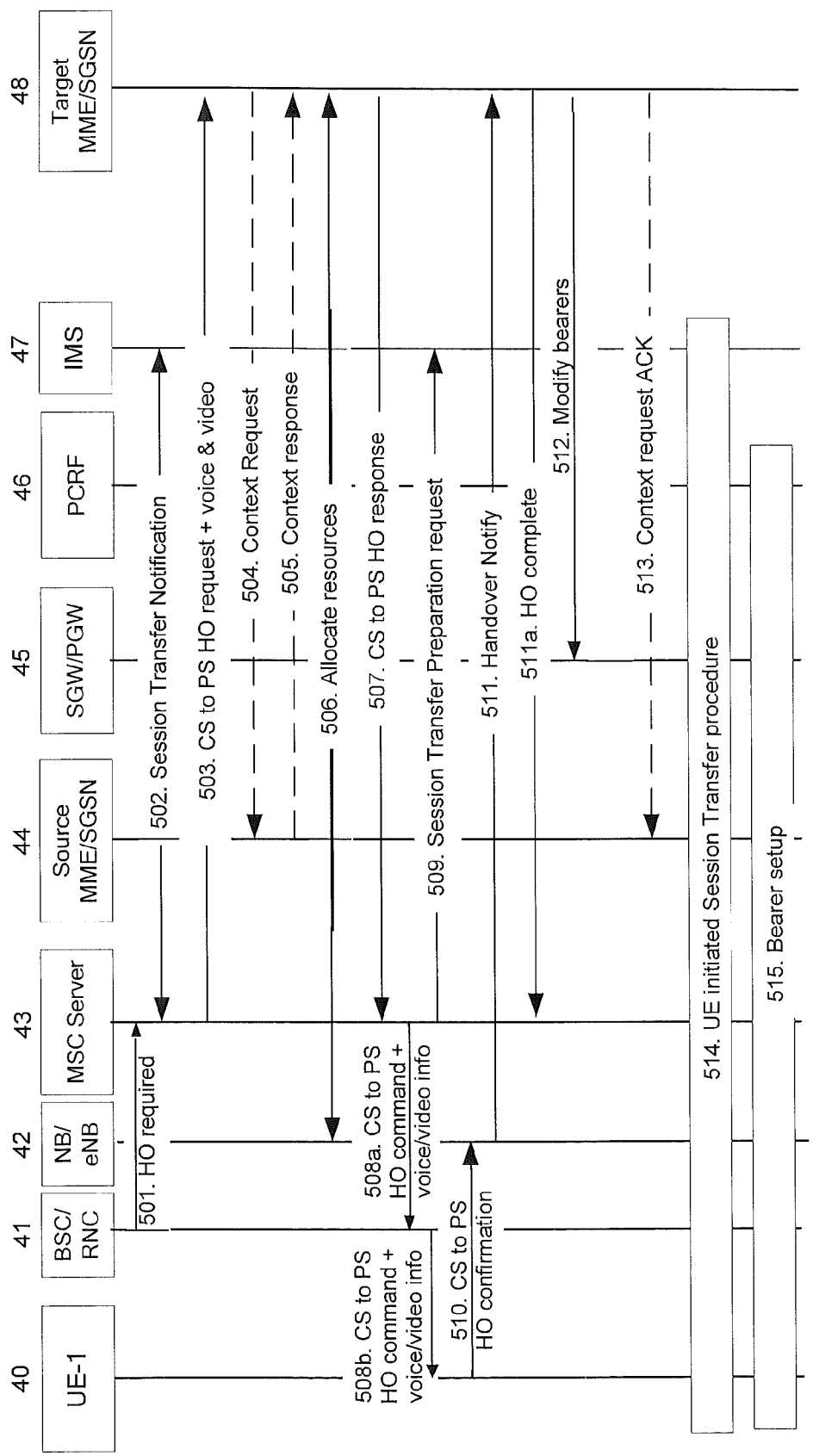
FIG. 5 is a signal diagram illustrating a procedure for a CS to PS handover with SRVCC of a call with video media.

FIG. 5 illustrates a new signalling procedure in the CS to PS SRVCC mechanisms to transfer a CS video call to an IMS video call, where the call includes both audio (voice) and video media. However, it should be understood that the principles apply to any call with data media (as described above) with or without the voice media. At the outset UE 40 has a call involving voice and video media established in the CS domain and the UE 40 is anchored in the IMS 47.

The procedure shown in FIG. 5 involves the same network entities as shown in FIG. 4, which carry the same reference numerals, and some of the same signalling steps. Signals 501 and 502 are the same as signals 401 and 402 of FIG. 4. The MSC Server 43 then sends a SRVCC CS to PS HO request 503 to the Target MME/SGSN 48 according to standard procedures of TS 23.216. Additionally, in signal 503, the MSC Server 43 includes an indication of the media to be transferred—i.e. audio only or audio and video.

Signals 504-505 are the same as signals 404-405 of FIG. 4. In signals 506, the Target MME/SGSN 48 allocates resources for all PS bearers in the PS access network by an exchange of messages with the NodeB/eNodeB 42, and in this case if the call includes video, the resources include those for the video bearer.

A SRVCC CS to PS HO response 507 is returned from the target MME/SGSN 48 to the MSC Server 43. The MSC Server 43 then sends a CS to PS HO command 508a to the BSC/RNC 41 of the access network. Note that this could be sent via the target MSC Server if such is available in the path between the Serving MSC Server 43 and the UE 40—for example if there has been a handover between MSC servers before the CS to PS SRVCC procedures arise. The access network sends the CS to PS HO command 508b to UE 40, indicating CS to PS handover. The MSC Server 43 also includes in the HO command message 508a the IP address/ports and selected codec for each of the IMS media (voice only or voice and video).

Signals 509-511a are the same as 409-411a of FIG. 4 described above, and accord with standard procedure set out in TS 23.216 for the UE to complete its attachment to the PS access network.

The Target MME/SGSN 48 then sends a Modify Bearer Request 512 to the SGW/PGW 45 as in signal 412 of FIG. 4, which in this case will include a request to update the PS bearer contexts for all of the bearers for the voice and/or video media. Signal 513 is the same as signal 413 in FIG. 4, and as in the standard procedure of FIG. 4 at step 514 the UE 40 initiates the Session transfer procedures according to TS 23.237. As a result of the Session transfer procedures, at step 515 the setup of dedicated bearers for each of the media (voice and/or video) are performed according to the dedicated bearer activation procedure as specified in TS 23.401.

Figure 6:
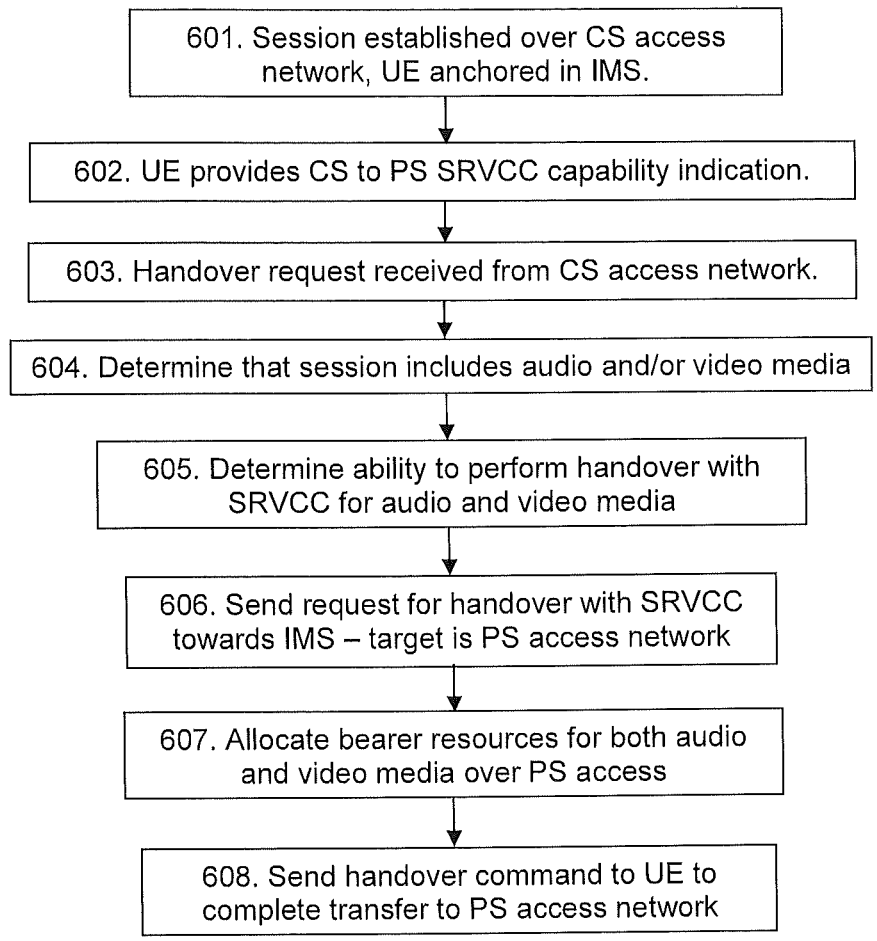
FIG. 6 is a flow diagram illustrating the principal method steps in a method of CS to PS handover with SRVCC of a call with video media.

FIG. 6 is a flow diagram illustrating the principal method steps in a method of CS to PS handover with SRVCC of a call with video media. At step 601, the UE has established a call/session over the CS access network, with the UE anchored in the IMS. At step 602 the UE provides the CS access network with its CS to PS capability indication. This may be have done, for example, when the UE attached to the CS network (i.e. before step 601), or it may be doe in a subsequent exchange of messages after the session is established. At step 603, a handover request is received from the CS access network requesting a transfer of the session. At step 604 a determination is made that the session comprises data (e.g. video) media in addition to, or without, any audio media. At step 605 a determination is made of the ability to perform the handover with SRVCC for the data media. At step 606 a request for handover with SRVCC is sent towards the IMS, indicating that the target access network to which the session is to be transferred is a PS network. At step 607, an allocation of bearer resources for the session, when handed over to the PS access network, is made. The resources allocated will include those for a data media bearer and, if there is any audio media in the session, an audio media bearer. Finally, at step 608 a handover command is sent to the UE together with the information it requires to complete the transfer of the session from the CS to the target PS access network.

Figure 7:
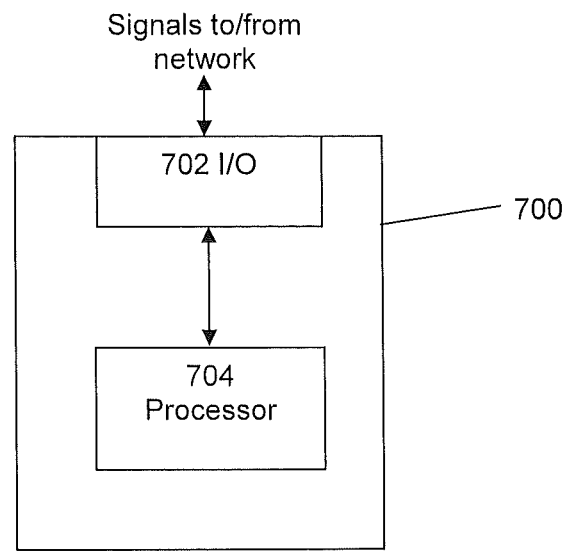
FIG. 7 is a schematic block diagram of a network server.

FIG. 7 is a schematic block diagram of a network server 700 configured for the implementation of the CS to PS handover procedure with SRVCC of a call/session that includes video or other data media from a UE accessing an IMS network via a CS access network. The network server 700 includes a processor 704 configured to determine the possibility of performing CS to PS handover with SRVCC based on the capability of the UE to perform a CS to PS handover with SRVCC, and the media in the session. The network server 700 also includes an input/output 702 for communicating with other network entities, including sending a signal to the UE that includes a handover command with information to enable the UE to transfer the data media and any audio media in the session to the PS access network.

Figure 8:
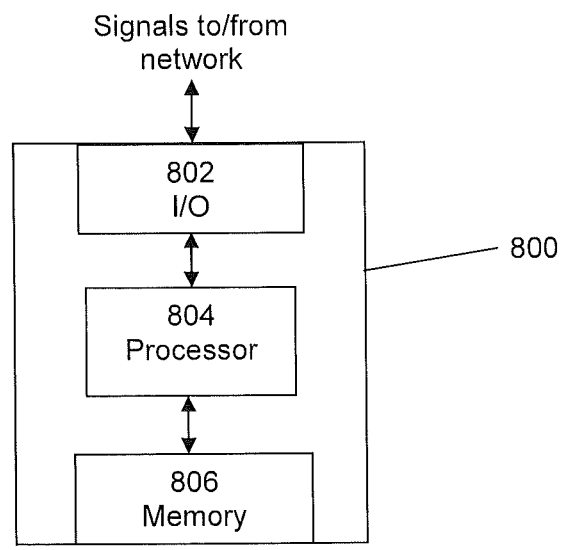
FIG. 8 is a schematic block diagram of a UE.

FIG. 8 is a schematic block diagram of a UE 800 configured for the implementation of a CS to PS handover procedure with SRVCC of a call/session that includes data media in addition to, or without, any audio media. The UE 800 includes an input/output 802 for receiving and transmitting signals, which may be signals sent via a CS access network, or signals sent via a PS access network. The UE 800 also includes a memory 806 storing data and program instructions. A processor 804 is configured to process the program instructions including, on receiving a CS to PS handover command from the CS access network, to transfer the data media and any audio media in the call session to the PS access network using information provided in the handover command.

The procedures and associated configuration of the UE and network entities described above allow handover of a call from a CS access to a PS access with SRVCC when the call includes data media such as video, CS data, fax etc.

The invention claimed is:

1. A method of performing a handover with Single Radio Voice Call Continuity, SRVCC, of a telecommunications session from a User Equipment, UE accessing an IP Multimedia Subsystem, IMS, network via a Circuit Switched, CS, access network to a target Packet Switched, PS, access network, the method comprising:
   prior to a handover request regarding the UE, notifying the CS access network by a communication from the UE of the UE's ability to perform a CS to PS handover with SRVCC for both the data media and any audio media in the telecommunications session;
   receiving the handover request by the target PS access network from the CS access network to transfer the telecommunications session;
   determining that the telecommunications session comprises data media in addition to, or without, any audio media;
   determining the ability to perform the handover with SRVCC for the data media;
   allocating bearer resources for the telecommunications session in response to being handed over to the PS access network, the bearer resources including a data media bearer and, responding to the presence of any audio media in the telecommunications session by further allocating an audio media bearer; and
   transferring the telecommunications session from the CS to the target PS access network.

2. The method of claim 1 wherein the data media being transferred comprises at least one of video, fax, and CS data.

3. The method of claim 1, wherein the handover request is sent from the CS access network to a Mobile Switching Centre, MSC, server, and the method comprises the following performed by the MSC server:
   determining the ability to perform the handover with SRVCC for the data media and for any audio media present; and
   forwarding the handover request to the target PS network together with an indication that the handover involves data media in addition to any audio media.

4. The method of claim 1, further comprising determining the ability to perform a CS to PS handover with SRVCC for the data media and any audio media in the telecommunications session in response to the capability of the UE to perform a CS to PS handover with SRVCC, and the data media and any audio media in the telecommunications session.

5. The method of claim 4, further comprising determining the capability of the UE to perform CS to PS handover with SRVCC in response to a 'CS to PS SRVCC capability' indication provided by the UE, which indication further indicates the media types for which the UE supports CS to PS handover with SRVCC.

6. The method of claim 5, further comprising determining the ability to perform a CS to PS handover with SRVCC in response to a 'CS to PS SRVCC allowed' indication provided from a Home Subscriber Server, HSS, when the UE registers with the IMS network, and the 'CS to PS SRVCC allowed' indication further comprises an indication of whether CS to PS SRVCC is allowed for audio media only or for audio and other data media.

7. The method of claim 1 wherein transferring the telecommunications session from the CS to the target PS access network comprises sending a CS to PS handover command to the UE which includes information to enable the UE to transfer the data media and any audio media to the PS access network.

8. The method of claim 7 wherein the information includes the port IP addresses and codecs to use for each of the media.

9. A network server configured for use in a telecommunications network wherein a call session from a User Equipment, UE, accessing an IP Multimedia Subsystem, IMS, network via a Circuit Switched, CS, access network is to be handed over with Single Radio Voice Call Continuity, SRVCC, to a target Packet Switched, PS, access network, the call session comprising data media in addition to, or without, any audio media, the network server comprising:
   a processor configured to determine, prior to receiving a handover request, the possibility of performing CS to PS handover with SRVCC based on the capability of the UE to perform a CS to PS handover with SRVCC, and the data media and any audio media in the call session; and
   an input/output for sending a signal to the UE that includes a handover command with information to enable the UE to transfer the data media and any audio media in the session to the PS access network.

10. The network server of claim 9, wherein the network server is a Mobile Switching Centre, MSC, server.

11. The network server of claim 9, wherein the processor is further configured to determine the possibility of performing CS to PS handover with SRVCC based on the presence of a 'CS to PS SRVCC allowed' indication in a subscription data for the UE, and on an IMS registration status of the UE.

12. The network server of claim 9, wherein the processor is further configured to determine the capability of the UE to perform CS to PS handover with SRVCC in response to a 'CS to PS SRVCC capability' indication provided by the UE, which indication further indicates media types for which the UE supports CS to PS handover with SRVCC.

13. The network server of claim 12, wherein the processor is further configured to determine the ability to perform a CS to PS handover with SRVCC in response to a 'CS to PS SRVCC allowed' indication provided from a Home Subscriber Server, HSS, when the UE registers with the IMS network, and the 'CS to PS SRVCC allowed' indication further comprises an indication of whether CS to PS SRVCC is allowed for audio media only or for audio and other data media.

14. An User Equipment, UE, configured to access an IP Multimedia Subsystem, IMS, network via a Circuit Switched, CS, access network to establish a call session that includes data media in addition to, or without, any audio media, and for the call to be handed over with Single Radio Voice Call Continuity, SRVCC, to a target Packet Switched, PS, access network, the User Equipment comprising:
an input/output circuit configured for receiving and transmitting signals via the CS access network and via the PS access network;
a memory configured for storing data and program instructions; and
a processor configured to process the program instructions on receiving a CS to PS handover command from the CS access network to transfer the data media and any audio media in the call session to the PS access network using information provided in the handover command,
wherein the processor is further configured to provide to the CS access network, prior to receiving a handover command, a 'CS to PS SRVCC capability' indication that includes an indication of media types for which the UE supports CS to PS handover with SRVCC.

15. The UE of claim 14, wherein the processor is further configured to process the program instruction to notify a network server of the ability to perform a CS to PS handover with SRVCC for the data media and any audio media in the call session.

16. The UE of claim 15, wherein the processor is further configured to determining the ability to perform a CS to PS handover with SRVCC in response to a 'CS to PS SRVCC allowed' indication received from a Home Subscriber Server, HSS, when the UE registers with the IMS network, and the 'CS to PS SRVCC allowed' indication further comprises an indication of whether CS to PS SRVCC is allowed for audio media only or for audio and other data media.

17. A computer program in a non-transitory memory and configured to be executed by a processor of the computer to cause the computer in a network to perform hand over with Single Radio Voice Call Continuity, SRVCC, of a telecommunications session from a User Equipment, UE accessing an IP Multimedia Subsystem, IMS, network via a Circuit Switched, CS, access network to a target Packet Switched, PS, access network, the computer program comprising computer readable instructions configured to respond to receiving a handover request from the CS access network to transfer the session by:
prior to sending a handover request, notifying, from the UE, the CS access network of an ability to perform a CS to PS handover with SRVCC for both the data media and any audio media in the telecommunications session;
determining that the telecommunications session comprises data media in addition to, or without, any audio media;
determining the ability to perform the handover with SRVCC for the data media;
initiating allocation of bearer resources for the telecommunications session in response to being handed over to the PS access network, the bearer resources including a data media bearer and, respond to the presence of any audio media in the session by further initiating allocation of an audio media bearer; and
transferring the telecommunications session from the CS to the target PS access network.

18. The computer program of claim 17, further comprising computer readable instructions configured for determining the capability of the UE to perform CS to PS handover with SRVCC in response to a 'CS to PS SRVCC capability' indication provided by the UE, which indication further indicates media types for which the UE supports CS to PS handover with SRVCC.

19. The computer program of claim 18, further comprising computer readable instructions configured for determining the ability to perform a CS to PS handover with SRVCC in response to a 'CS to PS SRVCC allowed' indication provided from a Home Subscriber Server, HSS, when the UE registers with the IMS network, and the 'CS to PS SRVCC allowed' indication further comprises an indication of whether CS to PS SRVCC is allowed for audio media only or for audio and other data media.

20. A computer program product in a non-transitory memory and configured to be executed by a processor of the computer to cause the computer in a network to perform hand over with Single Radio Voice Call Continuity, SRVCC, of a telecommunications session from a User Equipment, UE accessing an IP Multimedia Subsystem, IMS, network via a Circuit Switched, CS, access network to a target Packet Switched, PS, access network, the computer program comprising computer readable instructions configured to respond to receiving a handover request from the CS access network to transfer the session by:
prior to a handover request regarding the UE, notifying the CS access network by a communication from the UE of the UE's ability to perform a CS to PS handover with SRVCC for both the data media and any audio media in the telecommunications session;
determining that the telecommunications session comprises data media in addition to, or without, any audio media;
determining the ability to perform the handover with SRVCC for the data media;
initiating allocation of bearer resources for the telecommunications session in response to being handed over to the PS access network, including a data media bearer and, respond to the presence of any audio media in the session by further initiating allocation of an audio media bearer; and
transferring the telecommunications session from the CS to the target PS access network.

21. The computer program product of claim 20, further comprising computer readable instructions configured for determining the capability of the UE to perform CS to PS handover with SRVCC in response to a 'CS to PS SRVCC capability'indication provided by the UE, which indication further indicates media types for which the UE supports CS to PS handover with SRVCC.

22. The computer program product of claim 21, further comprising computer readable instructions configured for determining the ability to perform a CS to PS handover with SRVCC in response to a 'CS to PS SRVCC allowed' indication provided from a Home Subscriber Server, HSS, when the UE registers with the IMS network, and the 'CS to PS SRVCC allowed' indication further comprises an indication of whether CS to PS SRVCC is allowed for audio media only or for audio and other data media.

* * * * *